United States Patent
Parashar et al.

(10) Patent No.: US 11,799,721 B2
(45) Date of Patent: Oct. 24, 2023

(54) DOCUMENT DRIVEN NETWORK CONFIGURATION UPDATER

(71) Applicant: VMWARE, INC., Palo Alto, CA (US)

(72) Inventors: Shrinivas Sharad Parashar, Pune (IN); Sarat Chandra Annadata, Pune (IN); Pavan Vaidyula, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/712,206

(22) Filed: Apr. 4, 2022

(65) Prior Publication Data
US 2023/0239207 A1    Jul. 27, 2023

(30) Foreign Application Priority Data
Jan. 27, 2022 (IN) ............................. 202241004525

(51) Int. Cl.
| H04L 12/24 | (2006.01) |
| G06F 11/30 | (2006.01) |
| H04L 12/26 | (2006.01) |
| H04L 41/0816 | (2022.01) |
| H04L 41/0853 | (2022.01) |
| G06N 20/00 | (2019.01) |
| H04L 41/12 | (2022.01) |
| H04L 41/0859 | (2022.01) |

(52) U.S. Cl.
CPC ......... *H04L 41/0816* (2013.01); *G06N 20/00* (2019.01); *H04L 41/0853* (2013.01); *H04L 41/0859* (2013.01); *H04L 41/12* (2013.01)

(58) Field of Classification Search
CPC . H04L 41/0853; H04L 41/0859; H04L 41/12; H04L 41/0816; G06N 20/00
See application file for complete search history.

(56) References Cited

U.S. PATENT DOCUMENTS

| 2005/0201299 A1* | 9/2005 | Radi .................... H04L 67/1095 370/254 |
| 2018/0373961 A1* | 12/2018 | Wang ................ G06V 30/19147 |
| 2019/0268218 A1* | 8/2019 | Thomasson ......... H04L 41/0879 |
| 2020/0310394 A1* | 10/2020 | Wouhaybi ............. H04L 67/125 |
| 2021/0184936 A1* | 6/2021 | Mutnuru ................. H04L 45/64 |
| 2021/0263971 A1* | 8/2021 | Landes ............... G06F 16/9024 |

* cited by examiner

*Primary Examiner* — Christopher B Robinson
(74) *Attorney, Agent, or Firm* — Clayton, McKay & Bailey, PC

(57) ABSTRACT

Systems and methods are disclosed for updating network configuration documentation. In an example, a user can upload network configuration documentation with updates to a network to a server. The server can create an update topology corresponding to the documentation by identifying symbols that represent network components. The server can identify changes by comparing the update topology to a configuration data of an existing network. For example, the address of a gateway or the connections to the gateway can change. The server can cause the changes to be presented to a user, such as by highlighting the changes in a diagram. The user can confirm the changes, such as with a conversational workflow, and the server can save the changes to a database. The system can also send commands to the applicable network components to effectuate the confirmed changes.

20 Claims, 6 Drawing Sheets

DOCUMENT DRIVEN NETWORK CONFIGURATION UPDATER

RELATED APPLICATION

Benefit is claimed under 35 U.S.C. 119(a)-(d) to Foreign Application Serial No. 202241004525 filed in India entitled "DOCUMENT DRIVEN NETWORK CONFIGURATION UPDATER", on Jan. 27, 2022, by VMware, Inc., which is herein incorporated in its entirety by reference for all purposes.

BACKGROUND

Modern datacenters often have complex network topologies that incorporate complex configurations. These network configurations may include physical network configurations and software-defined network (SDN) configurations. Software defined networks may be created entirely in software and implemented as overlay networks on the physical ("underlay") network infrastructure. SDN networks may include arbitrarily created IP subnets with arbitrarily designated endpoints, such as virtual machines, attached thereto, regardless as to where the endpoints are physically located within the datacenter or even across datacenters. SDN networks can include logical network devices that are entirely created and implemented as software. Logical switches may define an SDN subnet and logical routers may establish rules for interconnectivity between them. Logical gateways may enable devices on a logical network to communicate with other logical networks or the outside world. Network documentation and diagrams form critical part of network configuration for physical as well as software defined networks. The network documentation and diagrams provide a static record of the state of the network at a point in time, or a desired state at some future point of time. In some cases, network documentation and diagrams are frequently used to analyze the network and make important decisions. Many organizations require the network configuration to be documented.

Because enterprise networks are so complex, it can be difficult for network administrators to identify differences between an existing network configuration and a documentation for a desired network state. Understanding these differences is essential for making configurations changes that are needed to align an existing network with documentation for that network.

SUMMARY

Described herein are systems and methods for updating the configuration of a network using network documentation. As used herein, the term "network documentation" can refer to any documentation that describes or illustrates the configuration of a network. For example, network documentation can include network diagrams and documents with written description of network components and their properties.

In some embodiments, a network's current configuration can be stored in a database as network configuration data. The configuration data can be stored as any kind of data related to the configuration of a network, such as diagrams, documents, and data tables of the network's topology. For example, the network configuration data can be stored as a relational data table with entries for components of the network. Each component entry can include data about a component's properties and relationships with other network components. As an example, a data entry for a gateway can identify its name, Internet Protocol ("IP") address, assigned security group, and other devices or segments of the networks accessible to the gateway.

To update the network configuration data, a user can create a create network documentation with the updates and upload the documentation to an assistant application (referred below simply as the "application") that is designed to assist an administrator with configuring a network according to documentation. The network documentation can be created using any software so long as designated formats are used. For a network diagram, network components can be assigned specific symbols that the application can be trained to recognize. As an example, the application can designate a first symbol for a gateway, a second symbol for a router, and a third symbol for a firewall.

The application can interpret the network documentation using one or more Natural Language Processing ("NLP") and image processing techniques. The application can interpret symbols in a network diagram using an image processing technique and match them to their corresponding network component type. Then, using an NLP technique, the application can interpret text in the network diagram (and any accompanying documentation) to identify associated properties of the network components.

Using templates for the network component types in the documentation, the application can build a network topology. The term network topology can refer to the arrangement of elements in a network. The network topology can include a physical and logical portion. The physical portion can define the physical arrangement of components in the network, such as the layout of cables, network devices, and wiring. the logical portion can define how data flows between components of the network. In other words, the logical portion can reveal how components of the network communicate with each other. The network topology can be a structured so that it can be interpreted by the application. For example, the network topology can be structured as one or more data tables with entries for each network component, its corresponding properties, and how data flows in and out of the component. The term "update topology" is used herein to refer to a network topology created from network documentation provided by a user.

After creating an update topology based on the user-provided network documentation, the application can identify a portion of the existing network's configuration that the network documentation corresponds to. In other words, the application can identify the portion of the network that is being updated by the network documentation. For example, the application can match the names, IP addresses, and other properties of components in the update topology to the existing network configuration data. Because the update topology is likely to have differences compared to the existing configuration data, the application may look for inexact matches. For example, the application can identify a portion of the network configuration data that most closely matches the update topology.

After matching the update topology to the current network configuration, the application can identify changes and prompt the user to verify that the identified changes are correct. The method used to verify the changes can vary. For example, the application can display a network diagram of the portion of the network being updated and highlight the changes. The application can display a list of identified changes. The application can also verify changes by conversing with the user and using NLP in a conversational workflow. The user can make any necessary modifications to the changes, such as any text or component in the update topology misinterpreted by the application, and the user confirm the changes. For example, the user can confirm the changes or request a modification to the application's current interpretation via an interactive user interface. Upon receiving the confirmation, the application can update the configuration data of the network to include the changes from the documentation. Updating the configuration of the network can modify the behavior of the network. For example, a new network segment may be added and certain endpoints may be attached to the new network segment.

User input can be saved for improving the creation of future topologies. For example, a confirmation from a user can be used to strengthen the confidence techniques used to create the update topology. On the other hand, when a user modifies the changes, those modifications can be stored and used to avoid similar user modifications in the future.

Certain network component types can have required property fields. That is, a require property field cannot be left empty. When the application recognizes a network component in user-provided network documentation, the application can determine whether the update topology includes all the required properties for the corresponding network component type. If data for a required property field is missing, the application can prompt the user to provide a value for the required field, which can then be validated according to requirements for the required field (e.g., perhaps the missing field is an IP address that needs to belong to a particular subnet). When a required field corresponds to a property of a particular network component that is identified in the update topology, the application can attempt to identify a matching network component in the network configuration data, and, if a match can be identified, the application can cause the known values of required fields be displayed to the user. The user can then confirm that the existing values are still current or provide alternative values.

The application can be configured with rules for the network configuration. The application can apply the rules to the update topology derived from the user-provided documentation to verify that the update topology includes a valid network configuration. For example, the network can be a tiered network, and the application can include a rule that segments of the network below a threshold tier must pass through a firewall to access network components above the threshold.

After updating the network configuration data for the network, the changes can be implemented on the network. For example, where the network documentation changes an IP address for a particular gateway, the application can update the gateway's IP address in the database. The IP address for the gateway can then be updated accordingly. To update the deployed network, a configuration process can change property values of one or more network components, add network components, and remove network components. For example, the configuration process can read a database of network configuration data and execute various functions to implement the differences identified between the update topology and the existing network configuration.

The techniques and processes described above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

DETAILED DESCRIPTION

Reference will now be made in detail to the present systems and methods that may be used to implement a document driven network configuration updater, including examples illustrated in the accompanying drawings. Wherever possible, the same reference numbers will be used throughout the drawings to refer to the same or like parts.

Systems and methods are disclosed for updating a network configuration. In an example, a user can upload network configuration documentation with updates to a network to a configuration assistant application (hereinafter referred to simply as "the application"). The application can create an update topology corresponding to the documentation and identify changes by comparing the update topology to the configuration of an existing network. For example, the address of a gateway or the connections to the gateway can change. The server can cause the changes to be presented to a user, such as by highlighting the changes in a diagram. The user can confirm the changes, such as with a conversational workflow, and the server can save the changes to a database. The system can also send (or cause a management entity to send) commands to the applicable network components to effectuate the confirmed changes.

Figure 1:
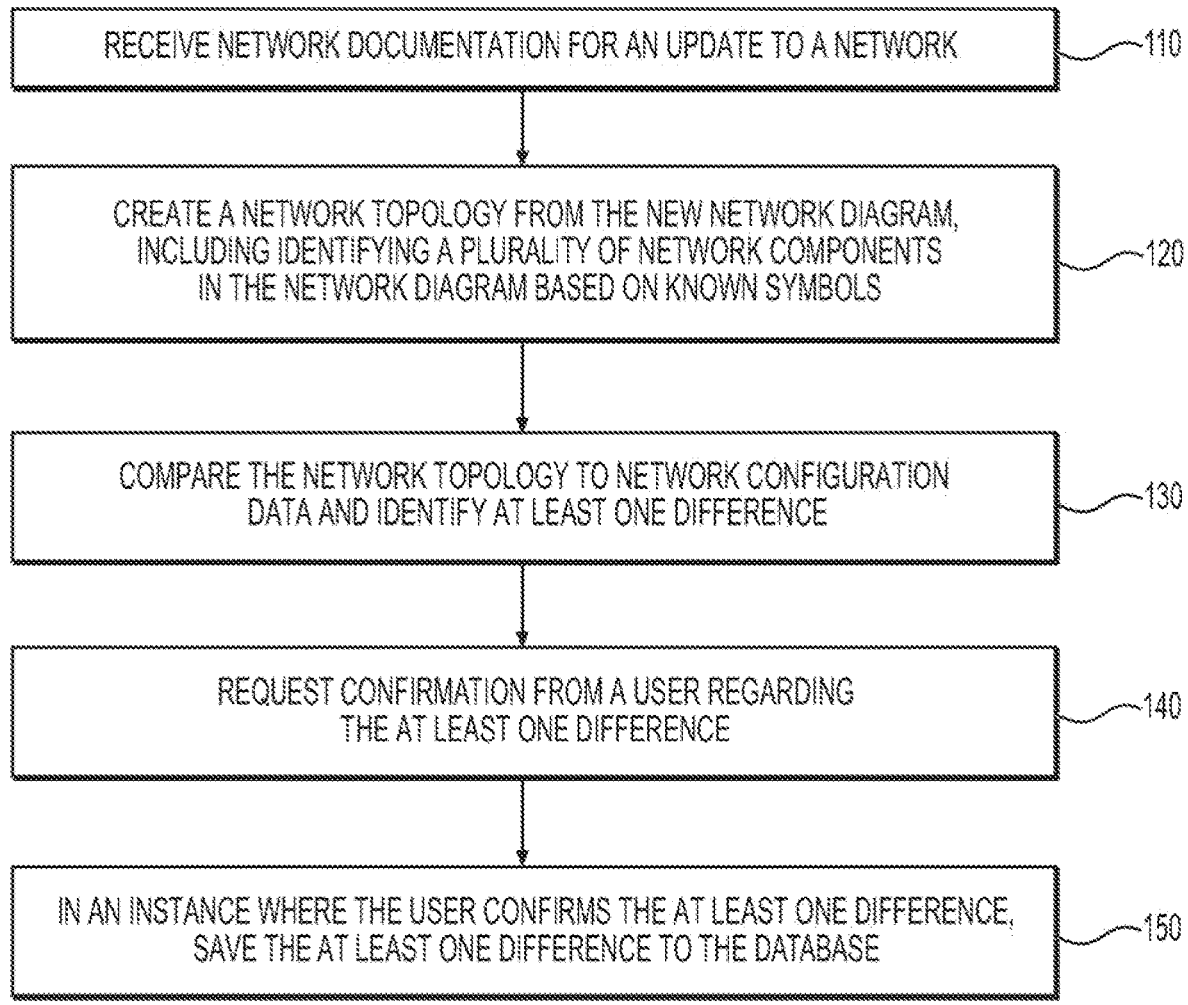
FIG. 1 is a flowchart of an example method for implementing a document driven network configuration updater.

FIG. 1 is a flowchart of an example method for implementing a document driven network configuration updater. At stage 110, a server can receive a network documentation for an update to a network. The application can be implemented on a single server or a group of servers, including multiple servers implemented virtually across multiple computing platforms. In an example, the application can comprise a web server front end for receiving network documentation in various formats. The web front end may then convey this data to an application layer for additional processing as described below. The web front end may be accessible using a web browser installed on a user device. Alternatively, the application as a whole, the user interface thereof, or other components of the application may be installed directly on a user's device. A user device can be one or more processor-based devices, such as a personal computer, tablet, or cell phone.

In an example, the application can include a GUI that allow users to upload network configuration documentation. The network configuration documentation can include any visual or written representation of a computer or telecommunications network. The user can upload the documentation as one or more data files, such as a Portable Network Graphics ("PNG") file, a Joint Photographic Experts Group ("JPEG") file, a portable document format ("PDF") file, an Extensible Markup Language (".XML") file, a JavaScript Object Notation ("JSON"), or a Microsoft Word Open XML Format Document (".DOCX") file. The user can upload the documentation from a user device using the application's GUI, and the user device can send the document to the application. For example, a user's device can send the document using a Hypertext Transfer Protocol ("HTTP") call or Application Programming Interface ("API") call to the application.

At stage 120, the application can create an update topology based on the documentation. To do this, the application can identify network components in the network diagram based on accepted symbols. Network diagrams are commonly created using a set of network symbols such as the Network Topology Icons set defined by Cisco Systems, Inc., which have become widely used in the industry. For example, the application can accept particular symbols to represent certain network components. This can allow the user to create documentation using any diagraming software that can generate the required symbols. The application may allow user-defined symbols to be mapped to particular network component types by an administrator ("admin") using an admin console or browser interface.

A comparison engine on the application can be responsible for creating the update topology. The comparison engine can include one or more processes that execute on the application. The comparison engine can create the update topology using NLP, image processing, and other similar techniques to identify network diagram in the documentations, and symbols in the network diagram, and then match the symbols with their corresponding network components. By associating components to one another, the comparison engine can create an overall topology of the network from the documentation. The comparison engine can then build associations among the network components based on the documentation using image and natural language processing. For example, the comparison engine can create a logical topology of how the network components are connected with each other. The comparison engine can use domain logic or another type of logic to build these associations.

Figure 5B:
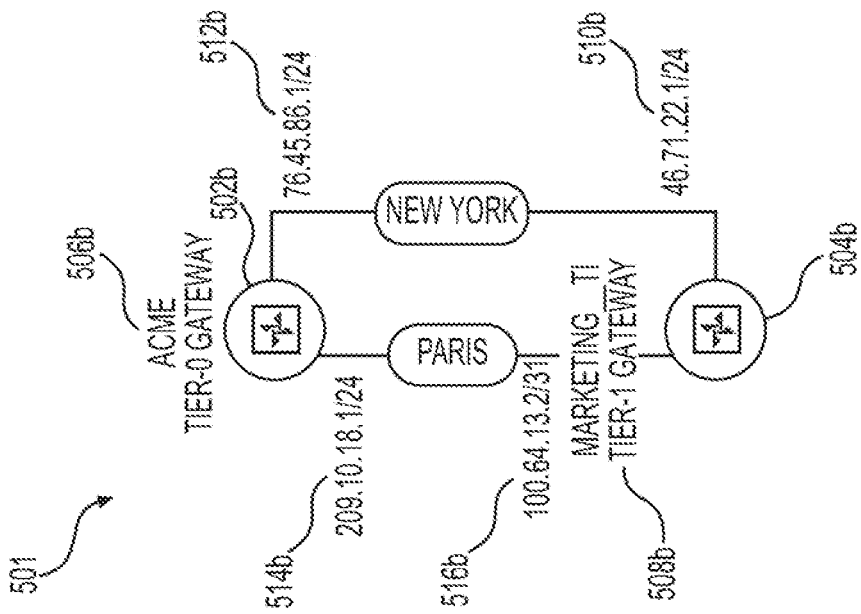
FIGS. 5A and 5B are illustrations of an example network diagrams before and after an update.
Figure 5A:
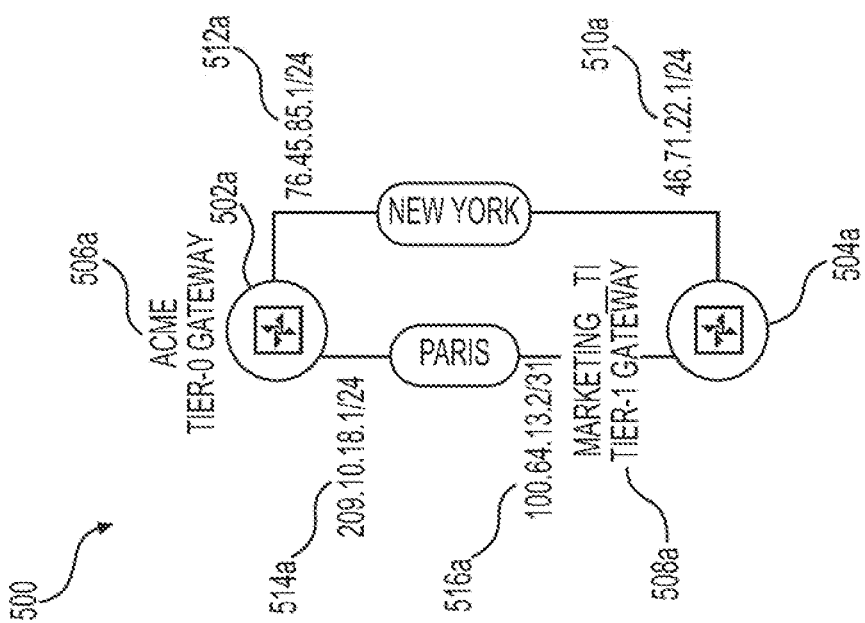

To help explain how the comparison engine can create an update topology, FIG. 5A illustrates of a portion of an example network configuration diagram that includes two gateways named acme gateway 502a and marketing_T1 gateway 504a. The comparison engine can identify the acme gateway 502a and marketing_T1 gateway 504a as network gateways based on their respective symbols. The comparison engine can also determine that the acme gateway 502a and marketing_T1 gateway 504a can communicate with each other based on the solid lines connecting them. Text next to network components can indicate associated properties. For example, gateways in the network can be separate into tiers where lower-numbered tiers have downlink connections to higher-numbered tiers, and likewise higher-number tiers have an uplink connection to lower-numbered tiers. Accordingly, the comparison engine can use NLP on the text 506a, reading "ACME TIER-0 GATEWAY" to determine that gateway 502a is a Tier-0 gateway. In one example, the application can cause the GUI to ask the user to confirm this understanding, either with text or voice. The GUI can receive the same types of responses from the user so that the application can verify the component identification in a conversational manner.

Likewise, the comparison engine can process text 508a reading "MARKETING_T1 TIER-1 GATEWAY" to determine that the marketing_T1 gateway 504a is a Tier-1 gateway. The comparison engine can also identify "ACME" and "MARKETING_T1" as unique names of the gateways 502a and 504a respectively. Additionally, the locations of Internet Protocol ("IP") addresses 510a, 512a, 514a, and 516a can indicate IP address properties associated with the gateways 502a and 504a. For example, for downlink communications going through New York, the comparison engine can determine that the acme gateway 502a can use the IP address 510a based on the IP address 510a being located near marketing gateway 504a next to the New York line. Likewise, the comparison engine can determine that IP address 512a is used for uplink communications through New York, IP address 508a is used for downlink communications through Paris, and IP address 514a is used for uplink communications through Paris.

Continuing with stage 120 of FIG. 1, the comparison engine can create a data file with the update topology. The data file can be created based on a template. The template can include a sub-template for each network component type. The sub-template can include various properties of the network component and what values should be used for each property. The comparison engine can fill the template for a network component based on information identified in the network documentation. Table 1 shows an example sub-template for a network component:

TABLE 1

```
export interface SddcUserConfiguration {
    infra_subnets?: IPv4CIDRBlock[ ];
    mgmt_subnets?: IPv4CIDRBlock[ ];
    domains: ProviderObject[ ];
    management_gateway_default_dns_zone: ProviderObject[ ];
    enforcement_points: ProviderObject[ ];
    mgw_snat_ip?: IPv4Address;
    cgw_snat_ip?: IPv4Address;
    vpn_endpoints?: VpnEndpoint[ ];
    labels?: ProviderObject[ ];
    gateways?: ProviderGatewayKeyValuePairs[ ];
}
```

In the example sub-template above, infra_subnets can be a property that calls for any standard subnet that the network component belongs to. Mgmt_subnets can call for any management level subnets of the network component. Domains can call for an administrative group that the network component belongs to. Management_gateway_default_dns_zone can call for a security group that the network component belongs to. Enforcement_points can call for where rules of a security policy apply. Mgw_snat_ip and cgw_snat_ip call for secure network address translation ("SNAT") addresses. Vpn_endpoints calls for the endpoint address of any associated virtual private networks ("VPN"). Labels calls for any associated network labels. Gateways calls for any key value pairs from a gateway provider.

The example sub-template above includes a "?" with some properties, which can indicate that the property is optional. In other words, properties without a "?" must have a value, such as the domains, management_gateway_default_dns_zone, enforcement_points properties.

If the comparison engine is unable to interpret a portion of the network documentation, then the comparison engine can converse with the user to obtain the information needed to complete the update topology. For example, the comparison engine can ask the user to provide a missing property value that is required, correct an invalid network configuration, or verify which network component that a property value is associated with. As an example, if the comparison engine is unable to interpret how traffic flows from the marketing gateway 504a to the acme gateway 502a, the comparison engine can ask the user whether to link the two gateways through New York, Paris, or another city.

The comparison engine can attempt to determine what a missing value should be before conversing with the user. As an example, using the example network configuration diagram from FIG. 5A, each network component can be assigned a unique name. If the network configuration diagram from FIG. 5A did not include the downlink IP address 510*a*, then the comparison engine can query the diagram database to determine whether the downlink IP address 510*a* for the marketing gateway 504*a* is already known and stored in the database. If so, then the comparison engine can insert the downlink IP address 510*a* into its corresponding property field in the template. The comparison engine can also prompt the user to confirm that the retrieved IP address is accurate before inserting it into the template.

The comparison engine can apply a machine learning ("ML") model when identifying missing information. For example, an ML model can be trained, based on previous user feedback, to better determine when a property value was omitted and when an existing property value can safely be used in place of missing information.

When automatically inserting missing information based on previously known values, the application can create a network diagram with the inserted values highlighted and display it for the user in the GUI. The highlight values can be selectable, allowing the user to confirm or modify the inserted value. The confirmation can also be done using a conversational workflow where the user can select responses or simply talk into their user device. NLP can be used to analyze the user responses and correct or verify the values inserted by the comparison engine.

At stage 130, the assistant application can compare the update topology to the existing network to identify changes (i.e., differences). Current network configuration information can be obtained via any available mechanism. Various methods are known for obtaining configuration information from an existing network, and thus need not be detailed here. For example, a physical network manager may query physical network devices directly to obtain device configurations, and a topology may be generated using various packet tracing methods. Once the manager obtains all available network configuration information, it may be queried by the assistant application via an API, or the manager may store the network configuration data in a datafile using a JSON or other data interchange format. Software defined networks (SDN) are defined in software by an SDN manager which maintains current configuration information of the deployed SDN networks and can therefore be similarly queried. In an example, in part because networks can be large and complicated, the documentation can correspond to only a portion of a network. As a result, the application may first be required to identify the portion of the network that the update topology corresponds to. The user can indicate the corresponding portion, or the application can identify the corresponding portion based on matching values. For example, the comparison engine can match the names or identifiers ("IDs") of network components in the update topology to components in the network configuration data. Where a match is found, the comparison engine can also compare relations between the network components in the update topology and configuration data to strengthen confidence in the match. Because the update topology is likely to have differences compared to the existing network configuration, the comparison engine may look for inexact matches. For example, the comparison engine can identify a portion of the network that most closely matches the update topology from the documentation. The comparison engine can also cause the GUI to prompt the user to confirm the correct portion of the network has been identified.

Comparing the update topology and configuration data can include identifying any differences. For example, the comparison engine can determine that an IP address for a network component is different or that a new network component was added or removed in the documentation. In one example, the documentation can include designated markings to indicate the removal of a network component. As an example, if a gateway is removed, the user can insert a cancel symbol or strikethrough text corresponding to the gateway. The comparison engine can be configured to recognize such markings to indicate that the gateway is being removed in the update topology.

At stage 140, the application can prompt a user to confirm the changes. In an example, the application can generate an interactive diagram of the update topology that highlights the differences. The application can cause the interactive image to be displayed in the GUI of the application. For example, if an IP address of a gateway has changed, the interactive image can highlight the IP address of the gateway in the diagram. In another example, the changes can be color-coordinated. For example, changes to existing property values and network components can be highlighted in yellow, new property values and network components can be highlighted in green, and deleted property values and network components can be highlighted in red. In another example, the detected changes can be presented as a list. The list can be presented in conjunction with, or in lieu of, the update topology diagram, depending on the implementation of the application, or the application's configuration or user preference.

In an example, the GUI can display a prompt requesting that the user confirm the changes. The prompt can include a button that the user can select to confirm or reject the changes. In one example, the application can require that the user confirm each identified change. This can help prevent users from assuming that all the changes are correct and simply confirming the changes without looking at the individual changes.

In an example, the GUI can allow the user to make modifications to the changes before confirming. For example, if a new configuration such as a new or modified IP address, new network component, or relation between network components was incorrectly determined by the comparison engine (or correctly determined from the documentation but was erroneous nonetheless) then the user can manually edit the configuration via the diagram. For example, the user can click on the network component that needs correction, which can cause the GUI to display properties for the selected network component. The user can then modify the selected network component's properties to accurately reflect the changes. The user can then confirm the changes, which can cause the GUI to inform the application of the confirmation.

In an example, user modifications can be saved for improving the creation of future topologies. For example, a confirmation from a user can be used to strengthen the confidence techniques used to create the update topology. On the other hand, when a user modifies the changes, those modifications can be stored and used to avoid the need for similar user modifications in the future.

At stage 150, where the user confirms the at least one difference, the application can save the changes to the database. For example, the application can map the changes to their corresponding fields in the topology. As an example, if the downlink IP address 510a from FIG. 5A is changed, then the application can modify the marketing_T1 gateway 504a in the diagram database by replacing the existing value for the downlink IP address 510a with the new value. In another example, the marketing_T1 gateway 504a can be a new network component introduced in the network documentation. The application can create a new entry for the marketing_T1 gateway 504a using a template and insert the appropriate values into their corresponding property fields, such as the downlink IP address 516a for Paris, the downlink IP address 510a for New York, the component name "marketing_T1," the gateway tier 508a, and other network components that it connects to, such as the acme gateway 506a.

The application, or another server, can automate commands to effectuate changes in the network represented by the differences of stage 150. For example, if the property value for a network device's IP address is suggested based on prior learning from the network documentation and then confirmed by the user, this suggested property value can be saved in a database. Updating the database with the new IP address can cause a network manager or other type of configuration process to reconfigure the network device with the new IP address. For example, a request to update the configuration may be sent to the network manager via an API exposed by the network manager. The manager may update other devices that communicate with that network device with the new IP address so that they can continue to communicate with the network device.

Any process that updates the deployed network can be referred to as a configuration process. The configuration process can change the deployed network based on the identified differences between the update topology and network configuration and any suggested property values for network components that are confirmed by the user. These differences and property values can be stored in the database. This can trigger activity by the configuration process, or the configuration process can recognize the new database entries during periodic checks for updates. The configuration process can implement the differences by changing property values of one or more network components, adding network components, and removing network components. This can include making various API calls to change which network components exist, the settings of those network components, and changing which network components communicate with one another.

Figure 2:
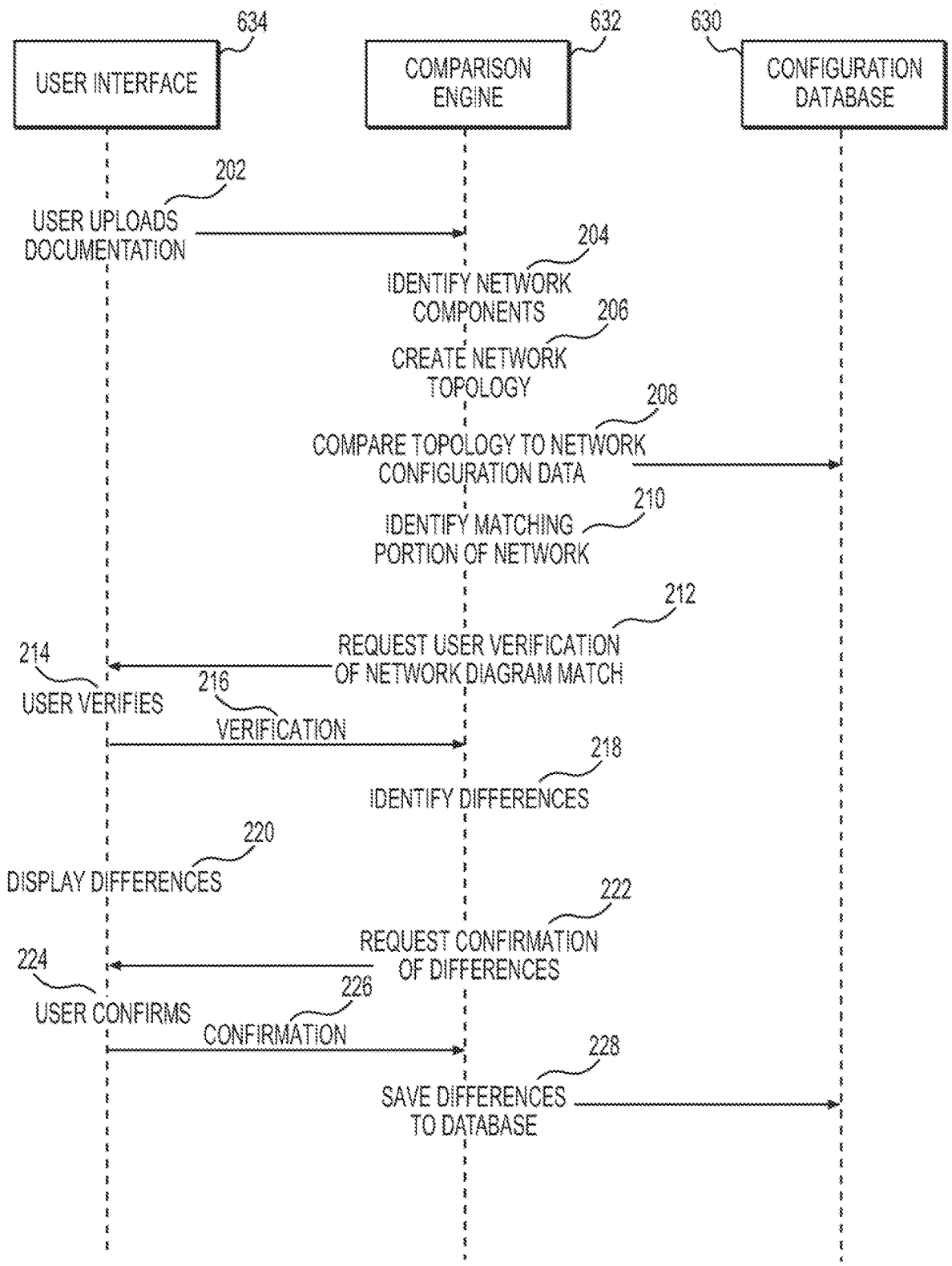
FIG. 2 is a sequence diagram of an example method for implementing a document driven network configuration updater.

FIG. 2 is a sequence diagram of an example method for implementing a document driven network configuration updater where the comparison engine automatically identifies the portion of the network configuration data to be updated. At stage 202, a user can upload network documentation using application GUI ("USER INTERFACE") 634. The user can upload the documentation as one or more data files, such as a .PNG, .JPG, .PDF, .XML, JSON, or DOCX file. The GUI can be on a user device of the user, and the user device can send the network documentation to the application.

At stage 204, comparison engine 632 can identify network components in the network documentation. To do this, the comparison engine can apply NLP, image processing, and other similar techniques to identify symbols in any diagrams provided in the documentation and match them with network components. For example, the application can accept various symbols to represent corresponding network components. The comparison engine can identify symbols in the documentation and match them to corresponding network components. In one example, the symbols can be set by an admin using an admin console.

At stage 206, comparison engine 632 creates an update topology from the network documentation. Creating the update topology can include identifying properties of network components using natural language processing (NLP) techniques. For example, the comparison engine can identify text identifying IP addresses, domains, IDs, enforcement points, and so on. The NLP engine can identify relationships between configurations. For example, a sentence in the documentation may state that a particular router has an uplink port with a particular IP address. As such, the NLP can, with confidence, generate a directed graph indicating a relationship exists wherein the router has an uplink port that has the specified IP address. The comparison engine can also build associations among the network components based on the network documentation diagram. For example, a line connecting two network components can indicate that those two components communicate directly with each other. The comparison engine can use domain logic or another type of logic to build the associations. The combination of the network components, their corresponding properties, and the associations between network components can make up the update topology. The comparison engine can save the update topology as a data file.

At stage 208, comparison engine 632 can access network configuration database 630 and compare the update topology with network configuration data of the network. For example, comparison engine 632 can compare various properties of network components, including other network components that they connect to, to identify portion of the network that matches the update topology at stage 210. As an example, the configuration of the existing network can be stored in a single data file, such as a relational data table. Comparison engine 632 can identify a portion of the existing network infrastructure that includes the same network component IDs and with the same associations with other network components. Because the update topology might have differences from the existing configuration, comparison engine 632 may identify exact matches as well as inexact matches. For example, comparison engine 632 can identify a portion of the existing network infrastructure that most closely matches the update topology. In an alternative example, portions of the network infrastructure can be stored as separate data files, such as separate data tables. Comparison engine 632 can then compare the update topology to the configuration data in each data file to identify the match.

The update topology can indicate which components are new, changed, or deleted from the existing infrastructure based on designated markings that comparison engine 632 can interpret. This can help comparison engine 632 more easily identify the matching portion of the network infrastructure because comparison engine 632 will know which components should not match up. It can also more readily help comparison engine 632 identify the changes that are being made, or that are required to be made, to the existing network.

At stage 212, the comparison engine can prompt the user to verify that the identified portion of the network is correct. For example, the comparison engine 632 can instruct the GUI 634 to display a diagram of the identified portion and a button that the user can select to confirm or reject that the identified portion correctly corresponds to the update topology. If there are other less likely identified existing portions, those can also be noted on the GUI and viewable by the user. At stage 214, the user can confirm by indicating (e.g., by interacting with the GUI via a mouse) that the identified portion is correct. At stage 216, GUI 634 may inform comparison engine 632 that the user confirmed the portion of the network. If the user rejects the identified portion, GUI 634 can so inform comparison engine 632 which can then attempt to identify another portion that may match and present it to the user. If comparison engine 632 cannot find a match, GUI 634 may prompt the user to provide additional information that can help in locating the correct portion, such as the name of a segment in the network near the portion of the network being updated.

At stage 218, comparison engine 632 can identify differences between the update topology and the existing network configuration. For example, the comparison engine can identify any network components in the update topology that are not in the existing configuration, identify any network components in the existing configuration that are not in the update topology, identify property values in the update topology that are different from their corresponding property values in the existing configuration, and identify any connections between network components that have changed. As an example, comparison engine 632 can determine that an IP address for a network component is different in the update topology.

At stage 220, GUI 634 can display the differences identified by the comparison engine. for example, the GUI can display a diagram of the update topology with the differences highlighted. As an example, if an IP address of a gateway has changed, the GUI can display the update topology with the changed IP address highlighted. The changes can be color-coordinated. For example, changes to existing property values and network components can be highlighted in yellow, new property values and network components can be highlighted in green, and deleted property values and network components can be highlighted in red. The detected changes can also be presented as a list. The list can be presented in conjunction with, or in lieu of, the diagram, depending on the example.

At stage 222, GUI 634 can prompt the user to confirm the changes. For example, GUI 634 can display two buttons, one to confirm and one to reject the changes. In one example, the application can require that the user confirm each identified change. This can help prevent users from assuming that all the changes are correct and simply confirming the changes without looking at the individual changes. GUI 634 can allow the user to make modifications to the changes before confirming. For example, if a new IP address, new network component, or relation between network components was incorrectly determined by the comparison engine, then the user can manually edit the diagram. As an example, the user can click on the network component that needs correction, which can cause GUI 634 to display properties for the selected network component. The user can then modify the selected network component's properties to accurately reflect the changes.

User modifications can be saved for improving the creation of future update topologies. For example, a confirmation from a user can be used to strengthen the confidence techniques used to create the update topology. On the other hand, when a user modifies the changes, those modifications can be stored and used to avoid similar user modifications in the future.

The application can be configured with rules for the network configuration. The application can apply the rules to the update topology to verify that the update topology includes a valid network configuration. For example, the network can be a tiered network, and the application can include a rule that segments of the network below a threshold tier must pass through a firewall to access network components above the threshold. As an example, the network can include a rule that tier 3 devices must pass through a firewall to communicate with tier 2 devices. If the update topology includes a tier 3 devices connecting to a tier 2 device without a firewall between then, then the application can identify this as an invalid configuration. The application can prompt the user to fix the invalid portion. The application can suggest an alternative topology, such as by inserting a firewall device and prompting the user to confirm the suggested alternative.

At stage 224, the user can confirm the changes. For example, the user can select the confirm button described above. At stage 226, GUI 634 can inform comparison engine 632 of the confirmation. For example, the user device can make an API call to the application that includes a value indicating that the user accepted the changes.

At stage 228, comparison engine 632 saves the change to the configuration database. For example, the diagram database can store a data table with entries for each network component in the network infrastructure and their associated properties. The application can update values in the data table corresponding to the changes, which can include adding new entries for new network components or properties and deleting entries for network components that were removed.

The application, or a network manager, can automate commands to effectuate changes in the network represented by the differences saved at stage 228. For example, if a user adds a new VM in the network documentation, adding the VM to the database can cause another application, such as a virtual infrastructure manager, to create a new network VM with the properties saved to the database. Other devices can be configured with information for communicating with new network VM based on the saved data.

Figure 3:
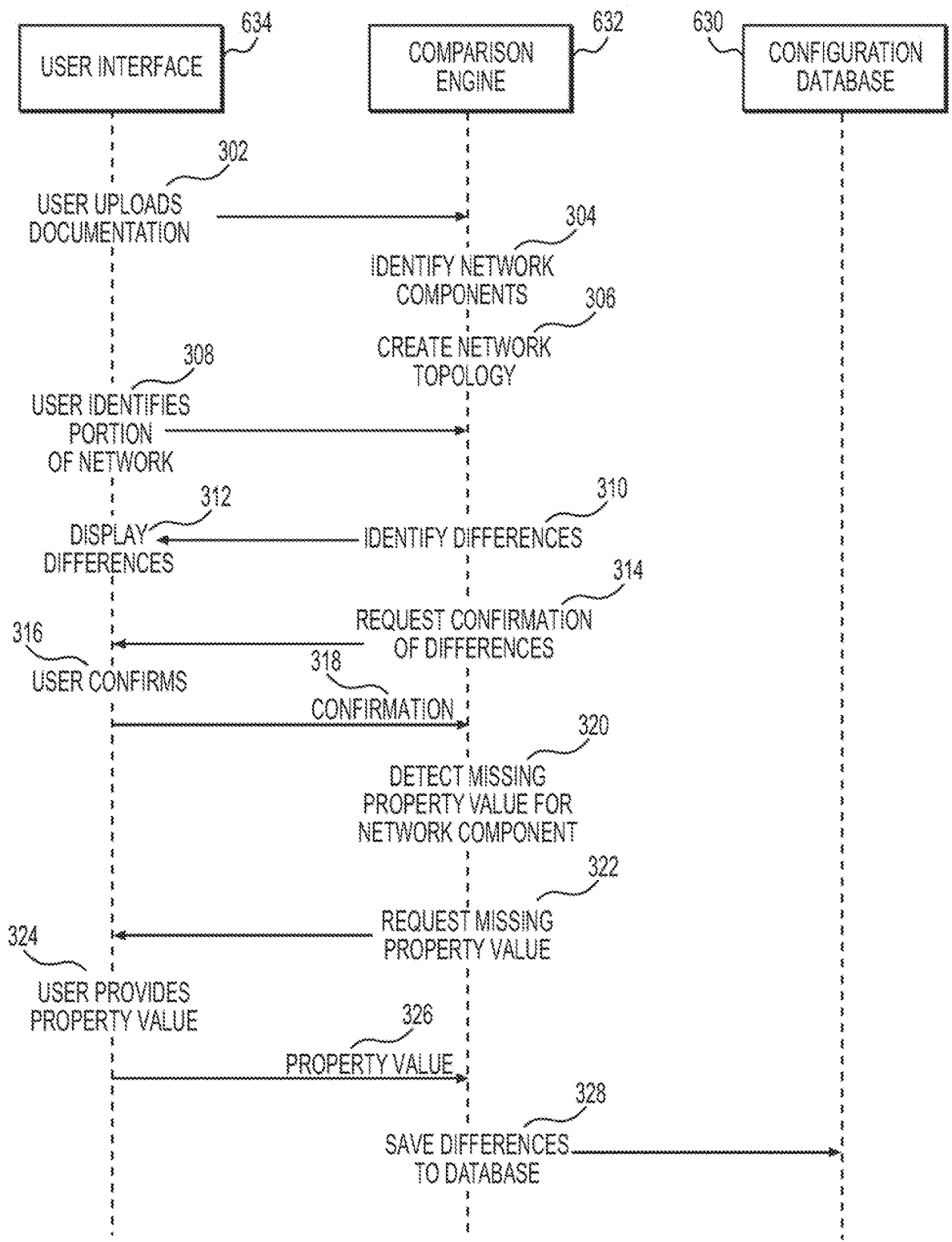
FIG. 3 is a sequence diagram of another example method for implementing a document driven network configuration updater.

FIG. 3 is a sequence diagram of another example method for implementing a document driven network configuration updater that includes the user identifying the portion of the network to be updated and the application identifying required information missing in the update topology. At stage 302, a user can upload network documentation using application GUI 634. The user can upload the documentation as one or more data files, such as a .PNG, .JPG, .PDF file, .XML, JSON, or DOCX file. GUI 634 can be on a user device of the user, and the user device can send the network documentation to the application.

At stage 304 comparison engine 632 identifies network components in the network documentation. To do this, comparison engine 632 can apply NLP, image processing, and other similar techniques as previously described to identify symbols in the network documentation and match them with network components. At stage 306, the comparison engine creates an update topology from the network documentation as previously described and saves the update topology as a data file. At stage 308, the user can identify a portion of the network that the network documentation corresponds to. The user can identify the existing portion using application GUI 634. As an example, GUI 634 can display a hierarchal tree menu of the network infrastructure that allows the user to navigate to and select the portion of the existing network that corresponds to the update topology. In another example, the user can upload a diagram image of the portion of the network that the comparison engine can use to locate an exact match and map the corresponding components. In another example, portions of the network infrastructure can be assigned unique IDs, and the user can input the unique ID corresponding to the update topology.

At stage 310, comparison engine 632 can identify differences between the update topology and the existing network configuration as previously described with reference to FIGS. 1 and 2. At stage 312, GUI 634 can display the differences as previously described. At stage 314, GUI 634 can prompt the user to confirm the changes as previously described. At stage 316, the user can confirm the differences as previously described.

At stage 320, comparison engine 632 can detect a missing property value for a network component in the update topology. As previously described, an admin can designate properties for network components that must contain a value and properties that can optionally contain a value. The comparison engine can check the property fields for each network component in the update topology and determine whether any fields that require a value are empty. If comparison engine 632 identifies a required field that is empty (or a value that may need correction), then at stage 322, comparison engine 632 can request the missing property value from the user via GUI 634. For example, the comparison engine can instruct GUI 634 to display a prompt or window informing the user of the property that needs a value and providing an input field for the user to input the missing value. Then, at stage 324, the user can input the missing property value using GUI 634. At stage 326, GUI 634 can send the missing property value to comparison engine 632. As an example, if the update topology includes a new network component, but the network documentation does not include an IP address of the new network component, then the user can be prompted to provide the IP address.

Before prompting the user to provide the missing property value at stage 322, the comparison engine can attempt to identify the missing value. For example, if the missing property value corresponds to a known network component, then the value may already be stored in the diagram database. The comparison engine can retrieve the value, if available, and prompt the user to confirm that the retrieved value is correct.

Detecting a missing property value can also include determining that a property value from the network documentation is invalid or incorrect. For example, the property fields can have designated or anticipated formats, and the comparison engine can determine that a value is incorrect where it does not satisfy the required format. As an example, invalid values for an IP address field can include non-numerical characters, an incorrect number of octets, or octets with numbers outside an allowable range.

The comparison engine can also identify possible incorrect property values by applying an ML model, which can be a type of trained algorithm. The identified differences between the update topology and the network configuration can be inputs to the ML model. Specifically, new or altered network components and any changed property values can be used as inputs, and the ML model can then recommend suggested property values as outputs. The ML model can also take a specific property as an input, such as when a missing property value is already identified by the comparison engine based on context or patterns as described above. The ML model can use contextual data for a property field to generate an output. As used herein, contextual data for a property field can refer to attributes of nearby network components and other property fields, such as IP addresses, gateway addresses, and configuration settings of related network components. The output from the ML model can indicate whether a property value is or is likely incorrect. The user can then be prompted to confirm, or in some cases correct, the corresponding value. As an example, if a gateway has an IP address that is valid but does follow the same format for other gateways in the network, then the ML model can indicate that the IP address for the gateway is likely incorrect and prompt the user accordingly.

The ML algorithm can also output suggested property values that can be proposed to the user. As an example, if the missing or incorrect value is a gateway address, the ML model can analyze similar property values of neighboring components in the network. If all or a significant portion of the neighboring components use the same gateway address, then the ML model can suggest the same gateway address to the user. In a similar manner, the ML model can suggest a security group for a network component based on neighboring or similar components being assigned to the security group.

The ML algorithm can also output suggested property values based on identified patterns. As an example, moving temporarily to FIG. 4, the missing value can be the downlink IP address 410 of the MARKETING_T1 gateway 406 that is "100.64.13.2/31." The comparison engine can identify the corresponding downlink IP addresses for the VMW_T1-IT gateway and the FINANCE_T1 gateway, which are "100.64.12.2/31" and "100.64.14.2/31" respectively. These downlink IP addresses on neighboring devices are identical except for the third octet. The comparison engine can assume that the octet should increase sequentially and suggest "100.64.13.2/31" for the missing property value by using the same downlink IP address of the neighboring devices, but inserting "13" into the third octet, which is between the "12" and "14" of the other downlink IP addresses.

In another example, if the difference indicates a gateway now connects to a New York office, the gateway and New York connection can be inputs to the ML model. The ML model can output suggested property values that will be needed to implement that change. This can include suggesting a new IP address that has previously been used repeatedly for connecting to the New York office. This IP address can be learned and trained into the ML model based on prior documentation and user corrections or input for this information in the past.

The ML model can be trained based on user feedback and historical network configuration data. Using FIG. 4 again as an example, the user can reject the suggested change and input the IP address as "100.64.16.2/31" with a "16" in the third octet instead of "13." This input can be stored in the database for use by a configuration process to change the deployed network. But the input can also be used in training the ML model. In this example, the ML model can be retrained to assume that the third octet in the downlink IP addresses differ by two instead of 1. Likewise, if the user changes the suggested IP address for connecting to the New York office, the retrained ML model can output the changed IP address when the differences involve similar components that will now connect to the New York office. In one example, detecting a missing value at stage 320 can include identifying an invalid configuration in the update topology. For example, certain network component types can be required to communicate with each other through a firewall. If the update topology includes two such network components connected without a firewall present, then the application can identify this as an invalid configuration. The application can prompt the user to fix the invalid portion of the update topology. Alternatively, the application can suggest an alternative topology, such as by inserting a firewall device and prompting the user to confirm the suggested alternative.

Finally, at stage 328, the comparison engine can save the identified changes and any property values provided by the user as described above with reference to FIG. 2.

Figure 4:
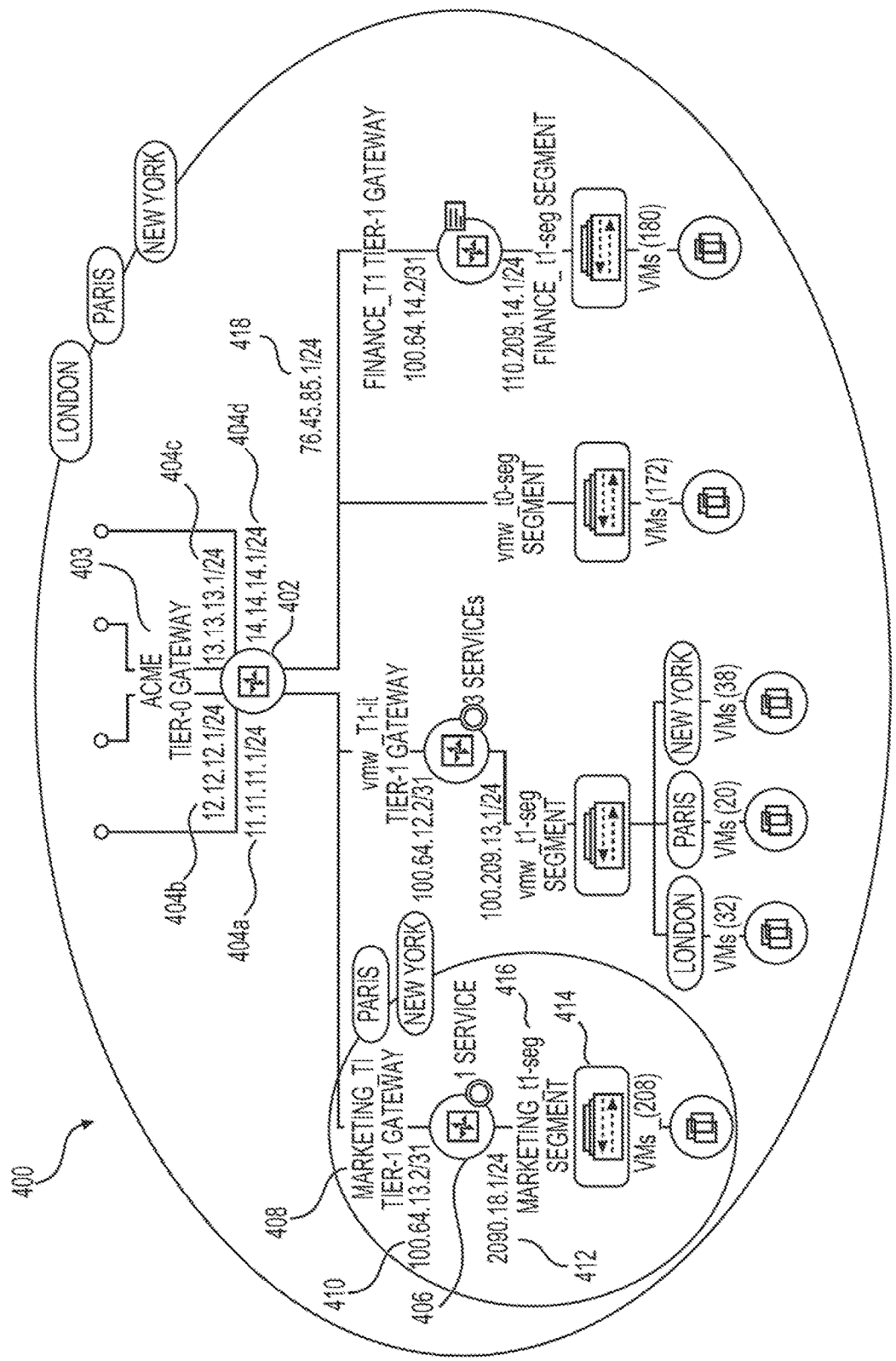
FIG. 4 is an illustration of an example network configuration diagram.

FIG. 4 is an illustration of an example network configuration diagram 400. The network configuration diagram 400 can represent one type of network documentation that can be used to update network configuration data using the methods described herein. The network configuration diagram 400 can include various symbols that represent network components. For example, gateway symbol 402, gateway symbol 406, and segment 414 each represent a network component. The comparison engine can be configured to identify the type of network component based on the symbol. For example, gateway symbols 402 and 406 have the same symbol image and can represent gateways. The segment symbol 414 can represent another portion of the systems network infrastructure. For example, when updating a network configuration diagram, a segment symbol can be used to indicate a portion of the network infrastructure that a network component connects to without including a diagram of that portion. For example, segment symbol 416 can represent a portion of a network infrastructure that includes other network components and network connections that are not being changed. The segment symbol 416 allows the user to represent that portion of the network with a single symbol.

Properties associated with network components can be positioned next to symbols. For example, the gateway name 403, "ACME," is positioned above the gateway symbol 402, thus indicating the name assigned to the corresponding gateway to be "ACME." Likewise, the gateway name 408 indicates that the gateway symbol 406 represents a gateway named "MARKETING_T1" and the segment name 416 indicates that segment symbol 414 represents a portion of the network named "MARKETING_t1-seg." In the network diagram 400, the names 403 and 408 also include property information about their corresponding gateways. For example, the network of the network diagram 400 can have a tiered structure, and the gateway name 403 indicates that the corresponding gateway is on "tier 0" and the gateway name 408 indicates that the corresponding gateway is on "tier 1."

The network diagram 400 can also include IP addresses for the network components. For example, gateway addresses 404a, 404b, 404c, and 404d indicate gateway addresses for sending data packets out of the network illustrated in the network diagram 400. Uplink IP address 418 indicates the IP address that tier 1 devices can use to send data packets to the tier 0 "acme" gateway represented by gateway symbol 402. The downlink IP address 410 indicates the IP address that the "acme" gateway can use to send data packets to the tier 1 "marketing_t1" gateway represented by gateway symbol 406. The uplink IP address 412 indicates the IP address that the marketing_t1 segment can use to send data packets to the "marketing_t1" gateway.

The comparison engine can determine whether a network component already exists in the network based on its symbol, name, properties, and other network components that it can connect to. As an example, the network diagram 400 can be a form of network documentation that a user uploads to the application. The comparison engine can build an update topology of the network diagram 400 by identifying network component types associated with symbols and using templates of the symbol types to input identified properties and connections with other devices. For example, the comparison engine can identify the gateway symbol 402 as a symbol for a gateway and load a template for gateway. The comparison engine can identify gateway addresses 404a, 404b, 404c, and 404d based on them being positioned next to the gateway symbol 402, next to a connection line, and above the gateway symbol 402 in the network flow. The gateway addresses 404a, 404b, 404c, and 404d can also be provided in a text document, and the comparison engine can use NLP techniques to associate the gateway addresses with the gateway. The comparison engine can input the gateway addresses into a gateway address field of the gateway's template. The comparison engine can identify the name of the gateway corresponding to gateway symbol 402 based on the gateway name 403 positioned above the gateway symbol 402. In one example, the comparison engine can use a predetermined naming convention to extract "tier-0" from the gateway name 403 and insert it into as associated field. The comparison engine can identify the uplink IP address 418 as an IP address for lower tiered devices to access the "acme" gateway based on the IP address being positioned between the gateway symbol 402 and symbols associated with lower-tiered network components. All these properties, and any other properties that may be provided in the network diagram 400, can be used to create an entry in a data table associated with the "acme" gateway. The comparison engine can use these same methods to create entries for the "marketing_t1" gateway and the "marketing_t1 segment." In an example, the entries for the network components identified in the network diagram 400 can comprise the update topology.

FIGS. 5A and 5B are illustrations of an example network diagrams before and after an update. For example, FIG. 5A illustrates an update network diagram 500 that represents an update topology created from network documentation, and FIG. 5B illustrates an existing network diagram 501 that represents a portion of a network that the update network diagram 500 corresponds to. The update network diagram 500 includes a gateway symbol 502a for a first gateway, a device name 506a for the first gateway, an uplink IP address 512a for "New York" network traffic to the first gateway, an uplink IP address 514a for "Paris" network traffic to the first gateway, a gateway symbol 504a for a second gateway, a device name 508a for the second gateway, a downlink IP address 508a for "New York" network traffic to the second gateway, and a downlink IP address 510a for "Paris" network traffic to the second gateway. The components of the existing network diagram correspond to the components of the update network diagram 500. Components that correspond to each other have the same number, but a different letter. For example, the gateway symbol 502b of the existing network diagram 501 corresponds to the gateway symbol 502a of the update network diagram 500, the device name 506b to the device name 506a, and so on.

The update network diagram 500 and existing network diagram 501 have the same values for each component except that the downlink IP address 512a differs from the downlink IP address 512b, which indicates that the IP address has changed. For example, a user can upload the update network diagram 500 to the application, and the comparison engine can create an update topology of the update network diagram 500 by identifying symbols and their corresponding properties. The comparison engine can use a template to create entries in a data table for the gateway symbol 502a and gateway symbol 504a that includes their corresponding properties.

The comparison engine can compare the data table to a diagram database that stores network configuration data of the existing network infrastructure to identify a portion of the network that the update network diagram 500 corresponds to. For example, the comparison engine can identify the existing network diagram 501 by matching the device names 506a and 504a to device names 506b and 506b in the existing network database. The comparison engine can also compare properties corresponding to the two gateways (represented by gateway symbol 502a/502b and 504a/b) to determine whether some or all the property values match, thus strengthening the confidence in the match. The comparison engine can also compare property values of components to match devices when the name of a device may have changed.

As shown in FIGS. 5A and 5B, the update network diagram 500 includes a change to the uplink IP address 512b, shown as uplink address 512a. Specifically, the uplink IP address 512b in the existing network diagram 501 is 16.42.85.1/24, and the uplink IP address 512a in the update network diagram 500 is 16.42.86.1/24. The comparison engine can match the update network diagram 500 to the existing network diagram 501 and determine that the uplink IP address 512b is being changed. The comparison engine can instruct the GUI to display the update network diagram 500 to the user with the uplink IP address 512a highlighted in some way. For example, the uplink IP address 512a can be highlighted a certain color, displayed in a list of identified changes, or otherwise highlighted to draw the user's attention to the change. This can be done for any additional identified changes as well. The GUI can also prompt the user to confirm that the change is correct.

If the update network diagram 500 includes a symbol for a new network component that does not currently exist in the network diagram database, then the comparison engine can identify the network components in the update network diagram 500 that do exist and display the update network diagram 500 with the new symbol highlighted as a new addition. The user can then confirm that the device has been added, and the application can update the network configuration data in the database accordingly. In the same manner, the comparison engine can determine if a network device has been removed and display that change as well for confirmation.

Figure 6:
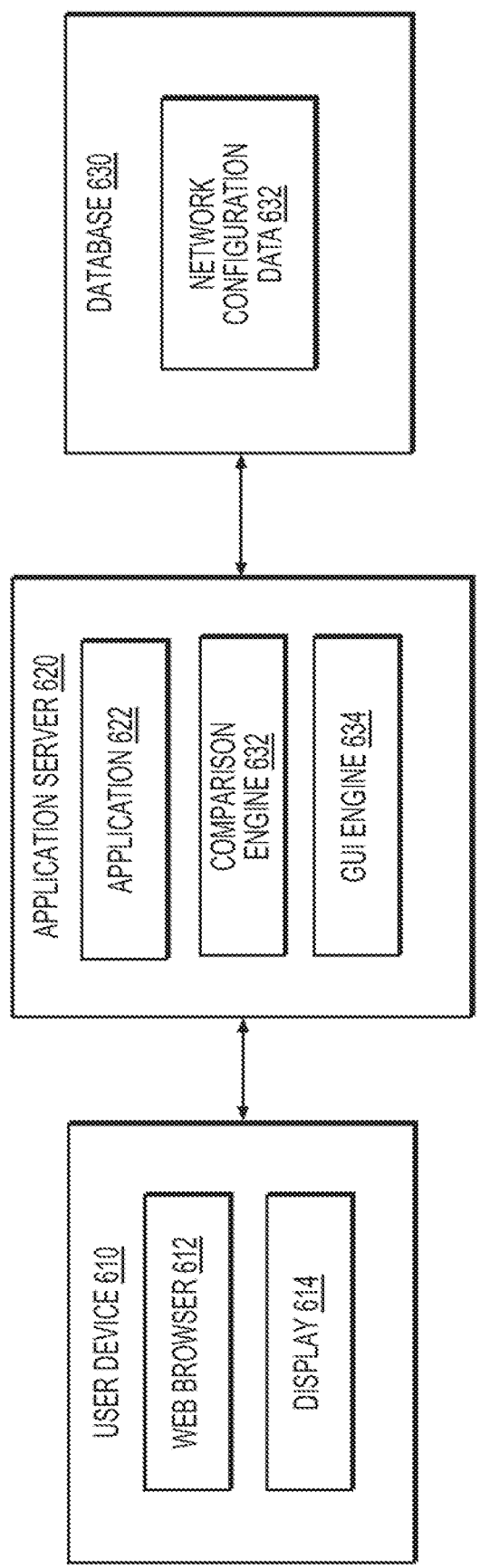
FIG. 6 is an illustration of an example system for implementing a document driven network configuration updater.

FIG. 6 is an illustration of an example system for implementing a document driven network configuration updater. A user device 610 can include a web browser 612 and a display 614. The user device 610 can be one or more processor-based devices, such as a personal computer, tablet, or cell phone. The web browser 612 can be an application that accesses content on the internet. The display 614 can be a device or component that displays images, such as a cell phone screen or computer monitor.

The user device 610 can communicate with an application 620 that hosts an application 622 for updating an existing network configuration data 632 that is stored in a network diagram database 630. The application 620 can be a single server or a group of servers, including multiple servers implemented virtually across multiple computing platforms, including a cloud-based platform. The application 622 can be a software program that runs on the application 620 and is accessible to users over the Internet. For example, a user can access the application 622 can navigating to a website associated with the application 622 using a Uniform Resource Locator ("URL"). The web browser 612 and application 620 can exchange communications using a network protocol to facilitate access to the application 622. For example, the web browser 612 and application 620 can communicate using Hypertext Transfer Protocol ("HTTP") calls. Alternatively, a local instance of the application 622 can be installed at the user device 610, and the local instance can exchange communications with the application 620 using API calls.

The network diagram database 630 can be a storage device that stores existing network configuration data 632, such as a database server. In some embodiments, the network diagram database 630 can be part of the application 620. The network configuration data 632 can include data relating to a network's current configuration.

In an example, the application 620 can include a comparison engine 624 that is responsible for creating update topologies of network documentation uploaded by the user, comparing the update topology to the network configuration data 632 to identify a matching portion of the network, and identifying differences between the update topology and the matched portion of the network. The comparison engine 624 can create update topologies using NLP, image processing, and other similar techniques to identify symbols in the network documentation and match them with their corresponding network components. In an example, the update topology can be represented in a data table, and the comparison engine 624 can build, based on a template, entries in the data table for each identified network component. Each entry can include properties of the network component identified in the network documentation. The comparison engine 624 can train and apply one or more ML models to build the update topology and to identify a matching portion of the network.

The application 620 can include a GUI engine 626 that can provide a GUI for users. For example, the GUI engine 626 can provide an interface for the web browser 612 that the user can use to upload the network documentation. The GUI engine 626 can communicate with the application 622 and comparison engine 624 to determine what to display in the GUI, such as displaying the update topology with identified changes highlighted for the user to confirm.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for document driven network configuration, comprising:
    receiving network documentation that includes updates to a network configuration, wherein the network configuration corresponds to at least a portion of a deployed network;
    creating an update topology based on the network documentation, including identifying a plurality of network components in the network documentation using at least one of image recognition and natural language processing;
    comparing the update topology to the network configuration to identify a difference between the update topology and the network configuration;

identifying a missing property value in the identified difference, wherein the property value corresponds to a required field for a network component in the update topology;
inputting the identified difference into a machine learning model, wherein the machine learning model outputs a suggested value for the property value;
prompting a user to confirm the difference and the suggested property value; and
in an instance where the user confirms the difference and the suggested property value, updating a database that stores the network configuration with the difference and the suggested property value, wherein the database is used by a configuration process to change the network configuration to implement the difference.

2. The method of claim 1, further comprising:
determining that a first network component of the plurality of network components in the update topology is missing the required property value;
prompting the user to verify the suggested property value;
receiving user input that differs from the suggested property value;
storing the user input as the property value; and
training another version of the machine learning model based on the user input.

3. The method of claim 1, wherein, in an instance where the user does not confirm the difference, the method further comprises:
receiving user input corresponding to a correction in the update topology; and
updating the database with the correction, wherein the correction is used in improving the creation of subsequent update topologies.

4. The method of claim 1, wherein the suggested property value is based on contextual data for the property, the contextual data including attributes of nearby network components in the network topology.

5. The method of claim 4, wherein the attributes of nearby network components includes at least one of an internet protocol ("IP") address, a gateway address, and a configuration setting.

6. The method of claim 5, further comprising:
determining that a portion of the update topology includes an invalid configuration based on properties associated with the plurality of network components;
generating an alternative topology of the update topology that corrects the invalid configuration;
causing an alternative diagram corresponding to the alternative topology to be displayed on a display; and
prompting the user to confirm or reject the alternative topology.

7. The method of claim 1, further comprising updating at least one network device based on the difference and the suggested property value.

8. A non-transitory, computer-readable medium containing instructions that, when executed by a hardware-based processor, causes the processor to perform stages for document driven network configuration, the stages comprising:
receiving network documentation that includes updates to a network configuration, wherein the network configuration corresponds to at least a portion of a deployed network;
creating an update topology based on the network documentation, including identifying a plurality of network components in the network documentation using at least one of image recognition and natural language processing;
comparing the update topology to the network configuration to identify a difference between the update topology and the network configuration;
identifying a missing property value in the identified difference, wherein the property value corresponds to a required field for a network component in the update topology;
inputting the identified difference into a machine learning model, wherein the machine learning model outputs a suggested value for the property value;
prompting a user to confirm the difference and the suggested property value; and
in an instance where the user confirms the difference and the suggested property value, updating a database that stores the network configuration with the difference and the suggested property value, wherein the database is used by a configuration process to change the network configuration to implement the difference.

9. The non-transitory, computer-readable medium of claim 8, the stages further comprising:
determining that a first network component of the plurality of network components in the update topology is missing the required property value;
prompting the user to verify the suggested property value;
receiving user input that differs from the suggested property value;
storing the user input as the property value; and
training another version of the machine learning model based on the user input.

10. The non-transitory, computer-readable medium of claim 8, wherein, in an instance where the user does not confirm the difference, the stages further comprise:
receiving user input corresponding to a correction in the update topology; and
updating the database with the correction, wherein the correction is used to improve the creation of subsequent update topologies.

11. The non-transitory, computer-readable medium of claim 8, wherein the suggested property value is based on contextual data for the property, the contextual data including attributes of nearby network components in the network topology.

12. The non-transitory, computer-readable medium of claim 11, wherein the attributes of nearby network components includes at least one of an internet protocol ("IP") address, a gateway address, and a configuration setting.

13. The non-transitory, computer-readable medium of claim 8, the stages further comprising:
determining that a portion of the update topology includes an invalid configuration based on properties associated with the plurality of network components;
generating an alternative topology of the update topology that corrects the invalid configuration;
causing an alternative diagram corresponding to the alternative topology to be displayed on a display; and
prompting the user to confirm or reject the alternative topology.

14. The non-transitory, computer-readable medium of claim 13, further comprising updating at least one network device based on the difference and the suggested property value.

15. A system for document driven network configuration, comprising:
a memory storage including a non-transitory, computer-readable medium comprising instructions; and
a hardware-based processor that executes the instructions to carry out stages comprising:

receiving network documentation that includes updates to a network configuration, wherein the network configuration corresponds to at least a portion of a deployed network;

creating an update topology based on the network documentation, including identifying a plurality of network components in the network documentation using at least one of image recognition and natural language processing;

comparing the update topology to the network configuration to identify a difference between the update topology and the network configuration;

identifying a missing property value in the identified difference, wherein the property value corresponds to a required field for a network component in the update topology;

inputting the identified difference into a machine learning model, wherein the machine learning model outputs a suggested value for the property value;

prompting a user to confirm the difference and the suggested property value; and in an instance where the user confirms the difference and the suggested property value, updating a database that stores the network configuration with the difference and the suggested property value, wherein the database is used by a configuration process to change the network configuration to implement the difference.

16. The system of claim 15, the stages further comprising:
determining that a first network component of the plurality of network components in the update topology is missing the required property value;
prompting the user to verify the suggested property value;
receiving user input that differs from the suggested property value;
storing the user input as the property value; and
training another version of the machine learning model based on the user input.

17. The system of claim 15, wherein, in an instance where the user does not confirm the difference, the stages further comprise:
receiving user input corresponding to a correction in the update topology; and
updating the database with the correction, wherein the correction is used to improve the creation of subsequent update topologies.

18. The system of claim 15, wherein the suggested property value is based on contextual data for the property, the contextual data including attributes of nearby network components in the network topology.

19. The system of claim 18, wherein the attributes of nearby network components includes at least one of an internet protocol ("IP") address, a gateway address, and a configuration setting.

20. The system of claim 15, the stages further comprising:
determining that a portion of the update topology includes an invalid configuration based on properties associated with the plurality of network components;
generating an alternative topology of the update topology that corrects the invalid configuration;
causing an alternative diagram corresponding to the alternative topology to be displayed on a display; and
prompting the user to confirm or reject the alternative topology.

* * * * *